Feb. 3, 1970 C. L. JACOBSON 3,493,877

ZERO-CROSSING DETECTOR FOR FREQUENCY MODULATED SIGNALS

Filed Dec. 15, 1967 2 Sheets-Sheet 1

INVENTOR.
CHARLES L. JACOBSON
BY Ronald Zibelli
Franklyn C. Weiss
ATTORNEYS

Feb. 3, 1970 C. L. JACOBSON 3,493,877

ZERO-CROSSING DETECTOR FOR FREQUENCY MODULATED SIGNALS

Filed Dec. 15, 1967 2 Sheets-Sheet 2

INVENTOR.
CHARLES L. JACOBSON
BY Ronald Zibelli
Franklyn C. Weiss
ATTORNEYS

United States Patent Office 3,493,877

Patented Feb. 3, 1970

3,493,877

ZERO-CROSSING DETECTOR FOR FREQUENCY MODULATED SIGNALS

Charles L. Jacobson, Pittsford, N.Y., assignor to Xerox Corporation, Rochester, N.Y., a corporation of New York Filed Dec. 15, 1967, Ser. No. 690,979
Int. Cl. H03d *1/18, 3/00*
U.S. Cl. 329—103 9 Claims

ABSTRACT OF THE DISCLOSURE

A zero-crossing detector for use in demodulating frequency modulated signals. A unit pulse is generated every time the incoming frequency modulated signal passes through the zero axis to be used by a filter and decoding apparatus to detect the modulating information. If, due to noise, more than one zero-crossing is detected within a predetermined time period, a pulse will be generated from the last crossover point.

BACKGROUND

In the frequency modulating technique known as frequency shift keying, data transmission is accomplished by assigning a different carrier frequency to each state of the data, i.e., mark and space, and transmitting the appropriate frequency for a period of time sufficient to assure reliable detection. The technique may be extended to include frequency transmission of data information with more than the normal two-level mark and space frequencies. That is, in a multi-level data transmission system employing frequency shift keying, a plurality of frequencies would be transmitted, one frequency for each level in the data waveform.

Transmission of the frequency modulated or frequency shift keyed signal in a facsimile or other type of system, for example, may be accomplished over any of the known transmission media, such as standard commercial telephone lines, microwave installations and direct wire. At a receiving location the frequency modulated signals must be demodulated and detected in order to obtain the original transmitted information. If the transmitted information is in the form of frequency shift modulated waves, prior art techniques of demodulation are to employ the well known ratio detector or discriminator circuits. Another well-known prior art technique is to detect the zero-crossings of the long-term average value of the incoming frequency modulated signals. Upon detection of the zero-crossings, signals can be generated in response thereto and passed through a low pass filter which effectively takes the short term average of the pulses. This average signal can then be decoded to recover the information in the signal waveform. Inasmuch as the entire demodulation process is dependent upon accurate detection of the zero-crossings, a reliable zero-crossing detector must be provided without attendant time jitter or distortion of the frequency modulated signal. See U.S. patent application No. 603,640, entitled Zero-Crossing Detector, filed Dec. 21, 1966, and assigned to the same assignee.

Since the zero axis crossovers can be disturbed by distortion, however, it is possible to obtain other crossovers within a predetermined time period. If a cross-over is missed, a non-linear demodulator characteristic will be obtained. It is desirable, therefor, to generate a pulse always from the last crossover point.

OBJECTS

It is, accordingly, an object of the present invention to provide an improved frequency modulated signal demodulator.

It is another object of the present invention to increase the efficiency of a data transmission system utilizing frequency shift keying.

It is another object of the present invention to improve the demodulation of frequency shift keyed signals in the presence of distortion.

It is another object of the present invention to effectively determine the zero-crossing points of the long-term average value of a frequency modulated signal.

It is another object of the present invention to effectively determine the last zero-crossing point of the long term average value of a frequency modulated signal within a narrow predetermined time period in the presence of noise and distortion.

BRIEF SUMMARY OF THE INVENTION

In accomplishing the above and other desired aspects, applicant has inverted new and improved apparatus for accurately determining the points at which frequency modulated signals in a demodulator cross the axis defined as the long-term average value of the signal, which is used to generate signals in accordance with such zero-crossings to determine the frequencies transmitted for later decoding and retrieval of such information. The invention utilizes a circuit for generating positive pulses upon detection of positive and negative-going zero-crossings. These signals are then used to trigger a monostable multivibrator to give constant width pulses upon detection of such positive pulses. The monostable multivibrator circuit comprises a bistable multivibrator and a capacitor discharging through a unijunction transistor. Thus, any time a zero-crossing pulse is received, the capacitor will be discharged if it has not already been discharged by the unijunction transistor. Thus, the pulse is always generated from the last input pulse and cross-over information is not lost. These pulses can then be passed to a low-pass filter to obtain the familiar eye pattern which can be used to decode the signal for recovery of the original information.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
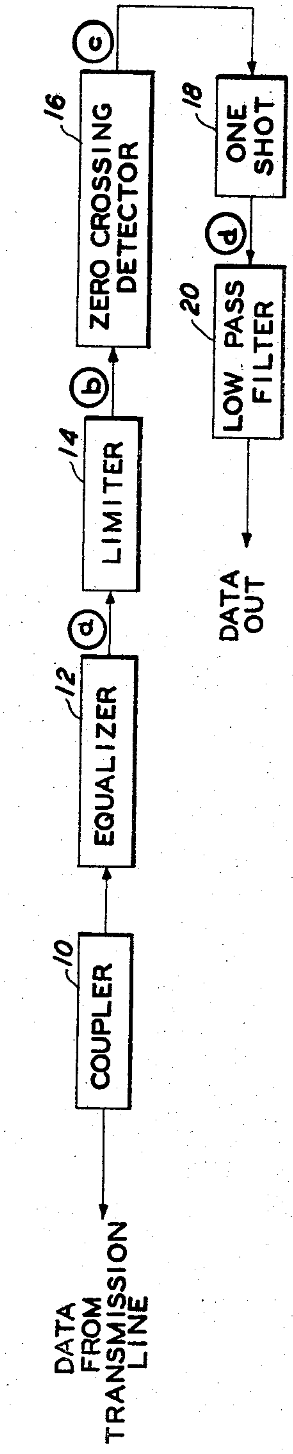
FIGURE 1 is a block diagram of the demodulator in accordance with the principles of the present invention.

Referring now to FIGURE 1, there is shown a block diagram of the demodulator circuit for the frequency modulated signals as received from a transmission media, of any known type. At the output end of the transmission media would be any prior art coupling apparatus 10 to couple the transmission line to the demodulating apparatus. Such a coupler could be a direct electronic coupler, or may be of the acoustic coupling type whereby the transmitted information is acoustically detected, as via a telephone receiver on the end of a commercial telephone network, for example.

From the coupler 10 the signals would then pass to an equalizer circuit 12 to provide equalization for the specific characteristics of the transmission medium. Such an equalizer circuit may be of any of the known types, such as for frequency attenuation and/or phase distortion. The output from the equalizer 12 would then be a signal seen in FIGURE 2*a* which, for example, comprises a frequency shift-keyed signal of four frequencies, $f_1$, $f_2$, $f_3$, and $f_4$.

Figure 2:
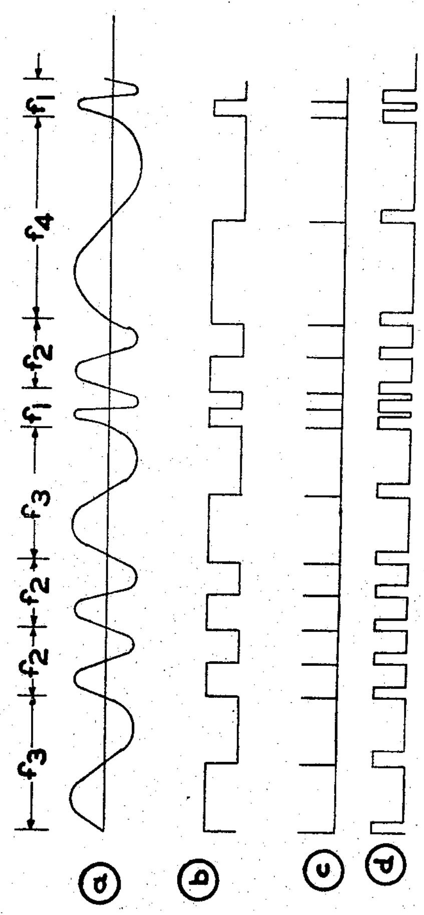
FIGURE 2 shows various waveforms helpful in understanding the block diagram of FIGURE 1.

The signals from the equalizer 12 are then passed to the limiter 14 of any known design, to amplify and limit the input signals to generate an essentially rectangular pattern where the rise time is not a function of the amplitude of said input signals fed thereto to produce a waveform seen in FIGURE 2*b*.

The zero-crossing detector 16, in a manner more fully hereinafter described, generates pulses, FIGURE 2*c*, in accordance with the zero-crossings determined from FIGURES 2*a* and 2*b*. One shot multivibrator 18 receives the waveform in FIGURE 2*c* and generates the output pulse train seen in FIGURE 2*d*. Low pass filter 20 receives the pulse waveform from one shot multivibrator 18 and produces the familiar eye pattern in the form of demodulated information in accordance with the input pulse train in FIGURE 2*d* which can be subsequently decoded to recover the transmitted information.

FIGURE 2*d* shows the generated pulses to be in the form of constant width pulses generated in response to the zero-crossings of the long-term average value of the input pulse train seen in FIGURE 2*a*. The fact that these pulses occur upon detection of the zero-crossings of the input information would allow the low pass filter to determine the average value of such pulses which, as previously mentioned, can be utilized to recover the transmitted information in a subsequent decoder.

For a pulse width of *t* seconds, pulse height of A units and a period of T seconds, the average value V*x* is given by $$Vx=\frac{2At}{t}$$

and since $T=1/f$ then $Vx=2Atf$ or that the average value of the pulse train from the filter is a linear function of the repetition frequency. Thus, a linear voltage versus frequency characteristic may be obtained from this type of detector. It is further noted that the slope of the curve is a direct function of the area of the pulse. Therefore, for the greatest voltage difference between each incoming frequency, it is desirable to make the pulse area as large as possible.

The most obvious limitation on the value of the pulse width is that it must not exceed ½ the period of the highest signaling frequency as this would cause overlap of the output pulses. If, for example, the highest signaling frequency is limited to 2250 Hz., then the pulse width must be less than 222 microseconds. Since distortion may be present in the received signal and disturb these crossovers, the pulse width must be narrow enough to avoid overlap of pulses and wide enough to produce the gain required.

Figure 3:
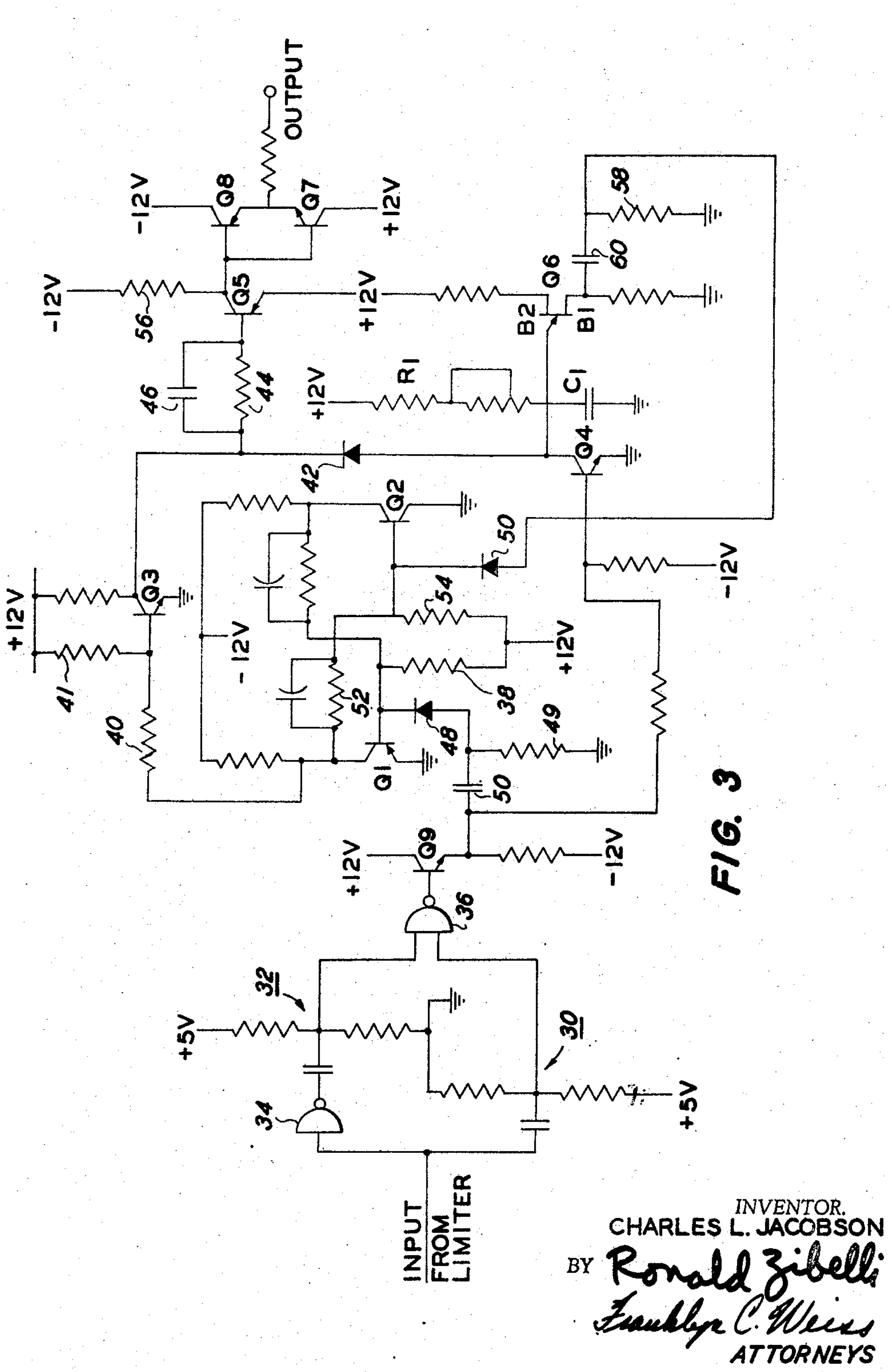
FIGURE 3 is a schematic diagram of the zero-crossing detector circuit of FIGURE 1.

To generate the pulse, a common circuit such as a one-shot multivibrator can be used. Since crossovers can be disturbed by distortion, it is possible to obtain another crossover before the one-shot has completely timed out. If the one-shot does not possess a zero recovery time, then this crossover will be missed and a non-linear demodulator characteristic will be obtained. The circuit shown in FIGURE 3 illustrates a circuit for generating the pulse from the last crossover point.

The output of the limiter is directed to differentiating network 30 and its inverse through gate 34 is fed to differentiating network 32 which are rectified into standard pulses by gate 36. Since, for purposes of illustration transistor Q1 is on, the collector thereof is essentially at ground which places the base of transistor Q3 somewhat above ground through resistor 40 and 41. With positive current to the base, transistor Q3 is kept on. The collector of Q3 is now at a ground potential which through the diode 42 keeps the capacitor C1 shorted to ground. Transistor Q5 is also in the on state as the ground potential from the collector of transistor Q3 is applied also to the base of transistor Q5 through resistor 44 and capacitor

46. The output of transistor Q5 is thus at a +12 volt level as the collector of transistor Q5 is now at the potential of the emitter which is connected to a +12 volt power supply.

When a positive pulse input from gate 36 is received through transistor Q9, utilized as an impedance buffer, it is A.C. coupled through resistor 49 and capacitor 50, and applied to the base of transistor Q1, through diode 48, back-biasing Q1 and turning it off. When transistor Q1 is turned off the collector of the transistor goes to −12 volts, thereby back biasing transistor Q3 and turning it off, which in turn turns off transistor Q5. Transistor Q2 which had been in an off state is now turned on with the collector of transistor Q1 going negative through the resistor 52, 54 voltage divider. The positive pulse is also applied to the base of transistor Q4 which turns the transistor on for the duration of the pulse which places its collector at a ground potential. This discharges the capacitor C1 and then the transistor Q4 is turned back off. As transistor Q5 had been turned off by reason of transistor Q1 being turned off, the output thereof is now at a −12 volt level as the collector of transistor Q5 is now coupled through resistor 56 to a −12 volt power supply .

As transistor Q3 has been turned off, the capacitor C1 is no longer shorted to ground. As it is no longer shorted to ground through the momentary turning on of transistor Q4, the capacitor is now able to charge toward the +12 volt supply at the rate determined by the R1–C1 time constant. When the charging voltage reaches a certain percentage of +12 volts, this percentage being determined by the intrinsic standoff ratio of the unijunction transistor Q6, the transistor will conduct, thereby discharging capacitor C1 to ground.

With transistor Q6 conducting, a pulse is generated at the B1 output of this transistor, which is fed back to the base of transistor Q2 through diode 50 after being A.C. coupled by resistor 58 and capacitor 60, thereby turning transistor Q2 off and thus, transistor Q1 back on again. This in turn causes transistors Q3 and Q5 to turn back on which causes the output to switch back to the +12 volts as hereinabove set forth.

It is noted that transistor Q4 is connected directly across capacitor C1. Thus, any time a positive pulse is received from gate 36, the transistor Q4 will turn on, thereby discharging capacitor C1 if it has not already been discharged by the unijunction transistor Q6. In this way, the pulse is always generated from the last input pulse and crossover information is not lost.

If the output from transistors Q7 and Q8, which is a current gain buffer amplifier, is passed directly to the input of a post-detection or low pass filter, a static voltage versus frequency characteristic can be obtained for the detector. The output from the filter, as seen in conjunction with FIGURE 1, is the demodulated frequency modulated signals, in this instance a four-level signal, which can be decoded in any manner to recover the transmitted information.

In the foregoing, there has been disclosed apparatus for effectively determining the last zero-crossing of the long-term average value of a transmitted frequency modulated signal in a predetermined time period. The circuitry was described in conjunction with a four-level signal; but it is obvious, however, that such four data levels are exemplary only, as any number of levels could be demodulated in a similar manner in accordance with the principles of the present invention. In addition, the circuitry was described in conjunction with standard width pulses but one skilled in the art may utilize the present invention to generate pulses of variable width in order to enhance the demodulation process. The circuit has utility in any frequency modulated data transmission system. Fascimile transmission systems, for example, utilizing the frequency modulation technique would advantageously use the disclosed invention in the demodulation of the transmitted information. Thus, while the present invention, as to its objects and advantages, as described herein, has been set forth in specific embodiments thereof, they are to be understood as illustrative only and not limiting.

What is claimed is:

1. A demodulating circuit for frequency modulated signals comprising means for amplitude limiting said frequency modulated signals into essentially a rectangular wave format, first means for generating short duration signals upon detection of positive-going signal crossings of the axis representing the long term average value of said frequency modulated signals, second means for generating short term duration signals upon detection of negative-going signals crossings of the axis representing the long term average value of said frequency modulated signals, third means for generating pulses of finite time duration in response to the pulses generated by said first and second generating means, fourth means coupled to said third generating means for resetting said third generating means upon receipt of a positive-going or negative going signal crossing, respectively, during the time period said generating means is generating said pulses of finite time duration, and means for taking the short term average value of the finite time duration pulses to obtain a static voltage versus frequency characteristic signal in accordance with the information in the frequency modulated signals.

2. The circuit as defined in claim 1 wherein said third means comprises bistable multivibrator means for generating finite time signals of equal duration, in response to said fourth means and wherein said fourth means comprises capacitor means for charging toward a predetermined voltage potential in accordance with an R-C time constant, first transistor means coupled to said capacitor means for discharging said capacitor means when the potential thereon reaches a predetermined value, thereby generating a pulse to reset said multivibrator means, and second transistor means coupled to said capacitor means for discharging said capacitor means if said capacitor means had not already been discharged by said first transistor means upon receipt of said positive-going or negative-going signal crossing, thereby resetting said multivibrator means.

3. The circuit as defined in claim 2 further including filter means responsive to said finite time signals for generating a static voltage versus frequency characteristic in accordance with the information contained in said frequency modulated signals.

4. In a frequency modulated signal demodulator circuit, a zero-crossing detector for generating finite time duration pulses at the axis crossings of the long term average value of the frequency modulated signals comprising first circuit means for generating short duration signals in response to the positive-going zero-crossings of the frequency modulated signals, second circuit means for generating short duration signals in response to the negative-going zero-crossings of the frequency modulated signals, and third circuit means coupled to said first and second circuit means for generating pulses of finite time duration in response to the last zero-crossing occurring within a predetermined time period.

5. The circuit as defined in claim 4 wherein said third circuit means comprises bistable multivibrator means for generating finite time signals, said finite time signals defining said predetermined time period, and fourth circuit means coupled to said bistable multivibrator means for resetting multivibrator means in response to a zero-crossing during the time period said multivibrator means is generating said pulses of finite time duration, whereby said finite time pulses are of equal duration.

6. The circuit as defined in claim 5 wherein said fourth circuit means comprises capacitor means for charging toward a predetermined voltage potential at a rate determined by an R-C time constant, first transistor means coupled to said capacitor means for discharging said capacitor means when the potential thereon reaches a predetermined value thereby generating a pulse to reset said multivibrator means, and second transistor means coupled to said capacitor means for discharging said capacitor means if said capacitor means had not already been discharged by said transistor means upon receipt of a zero-crossing signal, thereby resetting said multivibrator means.

7. The circuit as defined in claim 6 further including third transistor means coupled to said multivibrator means and said capacitor means for shorting said capacitor to ground potential during those times no zero-crossings are detected.

8. The circuit as defined in claim 7 wherein said first transistor is a unijunction transistor with a predetermined intrinsic standoff ratio.

9. The circuit as defined in claim 8 wherein said first circuit means is a first differentiating circuit and wherein said second circuit means is a second differentiating circuit, and further including gate means for inverting the input frequency modulated signals prior to application to said second differentiating circuit, whereby said short duration signals from said first and second differentiation circuits are of one polarity.

References Cited

UNITED STATES PATENTS

| | | | |
|---|---|---|---|
| 3,307,112 | 2/1967 | Clark | 329—104 |
| 3,404,229 | 10/1968 | Downey et al. | 325—320 X |

ALFRED L. BRODY, Primary Examiner

U.S. Cl. X.R.

178—66; 307—233, 241; 325—320; 328—140, 154; 329—104, 112, 126

PO-1050
(5/69)

UNITED STATES PATENT OFFICE
CERTIFICATE OF CORRECTION

Patent No. 3,493,877 Dated February 23, 1970

Inventor(s) Charles L. Jacobson

It is certified that error appears in the above-identified patent and that said Letters Patent are hereby corrected as shown below:

Column 5, line 15, "signals" should be --signal--;

Column 5, line 24, after "said" should be --third--.

Column 6, line 14, after "resetting" should be --said--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents